UNITED STATES PATENT OFFICE.

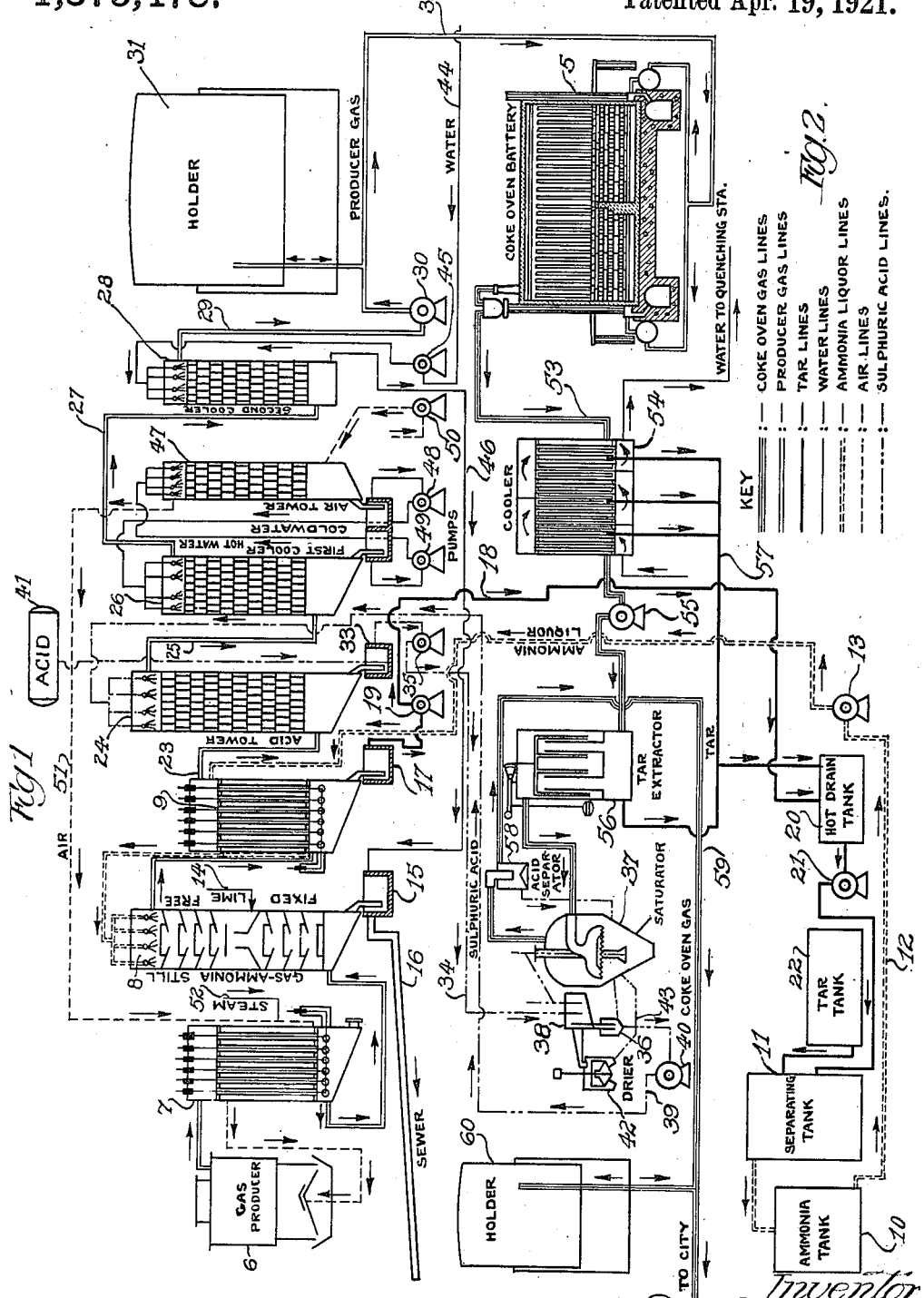

JOSEPH VAN ACKEREN, OF PITTSBURGH, PENNSYLVANIA, ASSIGNOR TO THE KOPPERS COMPANY, OF PITTSBURGH, PENNSYLVANIA, A CORPORATION OF PENNSYLVANIA.

AMMONIA AND TAR RECOVERY PROCESS.

1,375,478.     Specification of Letters Patent.     Patented Apr. 19, 1921.

Application filed August 25, 1919. Serial No. 319,734.

*To all whom it may concern:*

Be it known that I, JOSEPH VAN ACKEREN, a citizen of the United States, residing in Pittsburgh, in the county of Allegheny and State of Pennsylvania, have invented a new and useful Improvement in Ammonia and Tar Recovery Processes, of which the following is a specification.

This invention relates primarily to the recovery of ammonia from ammonia and tar-charged gas, and has for one of its objects the efficient production of a clean, dust-free and high-grade tar, and has for a further object the recovery of ammonia as a high grade ammonium sulfate, with great economy of heat or steam, and with simplicity and directness in the operation of the apparatus.

The invention is of particular utility in connection with a process for the recovery of tar and ammonia from producer-gas and from coke-oven gas, resulting in a combined production of high-grade ammonium sulfate derived from the ammonia from both the producer-gas and the coke-oven gas in a unitary operation, as disclosed in my prior Patent No. 1,307,571, dated June 24, 1919. For convenience the present description will be confined to this particular use of the invention; it will be understood, however, that the invention is capable of other applications, for example it may be applied to the treatment of a gas, or gases, otherwise derived from the carbonization of coal; hence, it is manifest that the invention is by no means limited in scope to the particular application or specific use herein described. The invention may have also such other objects and results as are found to obtain in the processes hereinafter set forth and claimed.

In the accompanying drawing:

Figure 1, is a conventional diagram illustrating an embodiment of the invention in a preferred arrangement of apparatus for practising its processes.

Fig. 2, is a key to the symbols employed in the various lines that show the connections between the apparatus indicated in Fig. 1.

Referring to the drawing, there is indicated at 5 a coke-oven battery, from which coke-oven gas is derived, and which is fired with producer-gas derived from the gas producer 6. The evolved producer-gas from the gas-producer 6 passes first to an electrical dust precipitator 7, in which it is also cooled by passing the producer-gas in counter-current with saturated-air delivered from the air supply line 51 into the electrical dust precipitator 7. As it enters the electrical precipitator 7, the producer-gas is still at a very high temperature, about 450° C., and its water saturation point is only about 80° C.; therefore, the producer-gas is still greatly super-heated with respect to its water and tar, and this and its other vaporizable content are carried as vapor into and through such precipitator 7, the latter functioning to free the passing gas from dust and other solid impurities in its current and also to act as a heat exchanger in which a large proportion of the heat is transferred from the producer-gas to the saturated-air that is on its way to the gas-producer. This saturated-air has a temperature of about 70° C., when it enters the said electrical dust precipitator 7; and as a result of the heat interchange in passing through the precipitator 7, the producer-gas issues with its temperature reduced to about 280° C., and the air issues with its temperature raised to about 350° C. At such temperature, the air passes to the grate of the gas-producer 6.

The partially cooled but still hot producer-gas from the electrical dust precipitator 7 passes, still carrying its water and tar as vapor, to a gas-ammonia still 8, in which the gas passes through the ammonia-liquor in the still. The ammonia-liquor from the separating tank 11 flows into the ammonia-liquor tank 10 from which it passes into an ammonia-line 12 and through a pump 13, to the electrical tar precipitator 9. Before it enters the electrical tar precipitator 9, a small quantity of water may be added to the ammonia-liquor. The ammonia-liquor enters the electrical tar precipitator 9 at about 27° C., and emerges from said precipitator 9 with its temperature raised to about 96° C., at which temperature the ammonia-liquor enters the gas-ammonia still 8.

As stated, the producer-gas enters the gas-ammonia still 8 at a temperature of about 280° C., and the heat of the gas is utilized in the still for the evaporation of the ammonia-liquor, and the producer-gas, carrying with it the evaporated ammonia-vapor in addition to its own ammonia, passes out of the still with its temperature reduced to about 120° C. The producer-gas entering the still at about 280° C., contains an abundance of available heat for effecting the distillation of the ammonia-liquor in the still. In order to effect dissociation of the fixed-ammonia in the ammonia-liquor within the still, a proportion of lime is added, at about one-half way down the still, as shown at 14. Any excess of heat in the producer-gas, over that required for the distillation of the ammonia-liquor, is utilized for heating the lime-liquor in the still. From the bottom of the still the drain discharges into a drain tank 15 and thence out into the sewer 16.

From the gas-ammonia still 8, the producer-gas carrying with it, in addition to its own ammonia, the ammonia-vapor evaporated from the ammonia-liquor in the still, passes to the electrical tar precipitator 9, which it enters at the before-mentioned temperature of about 120° C. At such temperature, the tar will begin to be precipitated, and in the electrical tar precipitator 9, the gas flows in counter-current with the ammonia-liquor which enters the tar precipitator at about 27° C. As a result of this heat interchange, the gas is reduced in temperature in the electrical tar precipitator 9 to about 80° C., and concurrently the temperature of the ammonia-liquor is elevated to about 96° C., as hereinbefore stated. As stated, the tar begins to drop out of the producer-gas at 120° C. and this precipitation of the tar continues until the gas is cooled down to a much lower temperature at which practically all of the tar will have been precipitated. Consequently, the gas in the electrical tar precipitator passes through the most efficient range of temperatures for the precipitation of the tar; thus all of the tar residue will be precipitated in the electrical tar precipitator. Any water carried by the gas from the still is also precipitated in the electrical tar precipitator.

The tar drains from the electrical precipitator 9 into a drain tank 17, and from the tank 17 passes into the tar-line 18 through which it is forced by a tar pump 19 into the hot drain tank 20. From the hot drain tank 20 the tar passes through another tar pump 21 to the separating tank 11 in which the tar is separated from any condensed ammonia-liquor in the tar discharged from the tank 20. As hereinbefore stated, the ammonia-liquor from the separating tank passes over into the ammonia tank 10; the tar passes into the tar tank 22.

The ammonia-charged producer-gas, at about 80° C. passes from the electrical tar precipitator 9, through the gas-line 23 to the hot acid-washer tower 24, which it enters at a temperature of about its saturation point. In said acid tower, the producer-gas gives up both its own content of ammonia and the ammonia-vapor derived from the dissociation of the ammonia-liquor in the still 8; the ammonia-freed producer-gas leaves the acid washer at a temperature which may be about 80° C. or lower, according to the rate of circulation of the acid solution. During the absorption of the ammonia from the producer-gas, the acid solution is kept hot by the absorption reaction and by reason of the little super-heat remaining in the gas, practically no water is picked up by the gas in passing through said acid washer, and so there is no precipitation of ammonium sulfate in said acid washer.

Thence, the ammonia-freed gas flows through the gas-line 25, to the first-stage final-cooler 26, through which it flows in counter-current with warm water that enters such cooler at about 50° C. In this cooler, the gas is cooled to about 65° C. and to a great extent dehydrated, and thence passes through a gas-line 27 to the second-stage final cooler 28, through which it passes in counter-current with cold water and issues further dehydrated and cooled to a temperature of about 25° C. The clean, cooled and relatively dry producer-gas is drawn off through the gas-line 29 by the exhauster 30 and thence is forwarded to the producer-gas holder 31 and on, through the producer-gas line 32, to the before-mentioned coke ovens 5, in which such producer-gas is burned to provide the heat for the coking of the coal charges in the ovens.

The ammonia-charged acid solution from the aforesaid acid-wash tower 24 discharges into a drain tank 33, and thence into an acid line 34, through which it is forwarded by a pump 35 to the mother-liquor tank 36, which feeds the saturator 37. The drain from the drain table 38 passes through the mother-liquor tank 36 to an acid-line 39, through which the surplus acid solution from the mother-liquor tank is forced back by the acid pump 40 to the acid washer 24, maintaining a constant circulation of the hot acid solution, to which a proportion of fresh acid is constantly added from the acid tank 41. The drain from the centrifugal drier 42 and the saturator 37 also pass into the acid line 39, as indicated at 43.

The before-mentioned second-stage final-cooler 28, for the producer-gas, is cooled by fresh water continuously supplied through the water-line 44, by a water pump 45, and from this second-stage final-cooler 28, the water discharges through a waste water line 46 into the drain tank 15, and thence into the sewer 16. The first-stage final-cooler 26 for the producer-gas, receives its warm water at a temperature, as before mentioned, of about 50° C., from the air saturator tower 47, from which such water is drawn by the warm water pump 48; and the water issuing from said first-stage final-cooler 26 has a temperature of about 80° C. and is forced, by the hot water pump 49, to the top of the said air-saturator tower 47 into which it is sprayed—there being, as just mentioned, a constant recirculation of water through said first-stage final-cooler and said air-saturator. The air to be saturated and heated is forced into said air-saturator tower by the air fan 50 and enters the tower at a temperature of about 25° C. The air leaves the tower saturated at a temperature of about 70° C., and passes through the air-line 51 to the before-mentioned electrical dust precipitator 7, through which it flows in counter-current with the hot producer-gas. In order to supply the additional water-vapor necessary for further saturating the air, because of the fact that its saturation point is elevated in the electrical dust precipitator, steam may be supplied to the air just before it enters the electrical dust precipitator 7, the steam coming from a steam-supply line 52 from any suitable source of steam supply. As it issues from said electrical dust precipitator 7, the air has a temperature of about 250° C., and passes to the grate of the producer as before mentioned.

The coke-oven gas from the coke-ovens 5 passes through a gas-line 53 to the primary cooler 54, through which it passes in counter-current with cooling water, and thence is forwarded by the exhauster 55 to the tar extractor 56. In the primary cooler 54, the coke-oven gas is cooled to about 25° C., and the consequent condensate of tar and ammonia-liquor is drained from such cooler and conveyed through a tar and ammonia-liquor line 57 to the hot drain-tank 20 from which it is forwarded by the before-mentioned pump 21 to the separating tank 11, in which the tar and ammonia liquor are separated. The coke-oven gas from the exhauster 55 enters the tar extractor 56 at a temperature of about 30° C., and issues from said tar extractor at approximately the same temperature. The tar residue from the coke-oven gas in the tar extractor passes into the before-mentioned tar and ammonia drain-line 57. The tar-freed coke-oven gas, with its own content of ammonia, flows from the tar extractor 56 to the before-mentioned saturator 37, entering the same at a temperature of about 30° C. Discharging through the saturation-bath of the said saturator 37, the coke-oven gas both gives up its ammonia and effects the evaporation requisite to precipitate the ammonium sulfate derived not only from the ammonia of the coke-over gas, but also from the ammonia of the acid-solution from the acid washer 24 for the producer-gas, thus accomplishing a combined and simultaneous recovery of the ammonia from both the coke-oven gas and the producer-gas, in a uniform and high grade of ammonium sulfate, all produced from one saturation bath. The coke-oven gas issuing from the saturator 37 passes to the acid separator 58, in which the coke-oven gas is freed from any adhering acid, the latter being returned to the saturator 37. The coke-oven gas issues from the acid separator 58 and passes into a coke-oven gas-line 59, through which it is conveyed to the coke-oven gas holder 60 and thence to whatever service it may be employed in.

The processes of the invention may be practised in various ways, other than the particular embodiment that has been described for purpose of illustration, and still be within the scope and subject matter of the claims hereinafter made.

What is claimed is:

1. In a process for the recovery of tar and ammonia from producer-gas and coke-oven gas simultaneously, the combination of steps that consists in: subjecting the hot producer-gas to a primary cooling operation, by passing it in counter-current with the air going to the producer, and concurrently electrically precipitating the dust from said gas; subjecting the coke-oven gas to a primary cooling operation and draining off the condensate ammonia-liquor; preheating said ammonia liquor; then utilizing the partially cooled but still hot gas to effect distillation of the ammonia-distillate from said preheated ammonia-liquor condensate; then electrically precipitating tar from the producer-gas that is charged with the ammonia distillate from the distilling-operation, and concurrently further cooling such gas by passing it in counter-current with the ammonia-liquor during its preheating operation; then passing such gas through an acid-wash to absorb both the ammonia of the gas and the ammonia-distillate; and passing the tar freed coke-oven gas to and through a saturation bath to which the mother-liquor from the acid-wash of the producer-gas is also conveyed, and effecting the deposition of ammonium sulphate in such saturation bath; substantially as specified.

2. In a process for the recovery of tar and ammonia from producer-gas and coke-oven gas simultaneously, the combination of steps that consists in; subjecting the coke-oven gas to a primary cooling operation and draining off the condensate ammonia-liquor; preheating said ammonia-liquor; passing hot dust-freed producer-gas through a distilling-operation to which is also conveyed the preheated ammonia-liquor condensate from the coke-oven gas, and utilizing the hot producer-gas to effect distillation of the ammonia from said ammonia-liquor; then electrically precipitating tar from the producer-gas that is charged with the ammonia distillate from the distilling operation, and concurrently further cooling such gas by passing it in counter-current with the ammonia-liquor during its preheating operation; then passing such gas through an acid-wash to absorb both the ammonia of the gas and the ammonia-distillate; and passing the tar-freed coke-oven gas to and through a saturation bath to which the mother-liquor from the acid wash of the producer-gas is also conveyed, and effecting the deposition of ammonium sulfate in such saturation bath; substantially as specified.

3. In a process for the recovery of ammonia from two different ammonia-charged gases simultaneously, the combination of steps that consists in: cooling the gas of one type and draining off the condensate ammonia-liquor; distilling said ammonia-liquor by passing through it hot dust-freed ammonia-charged gas of the other type; passing such second-named gas and the still-vapors through an acid-wash to absorb the ammonia of the gas and also the ammonia distillate; conveying the mother-liquor from such acid-wash to a saturation-bath; and passing the first-named gas, of relatively low temperature, through said saturation-bath, therein effecting the absorption of ammonia from said first-named gas and simultaneously effecting the deposition of ammonium sulfate derived from both such ammonia given up by said first-named gas and from the aforesaid mother-liquor, charged with the ammonia of the second-named gas and also with the ammonia-distillate derived from the distillation of the ammonia-liquor condensed from said first-named gas, substantially as specified.

4. In a process for the recovery of ammonia from two different ammonia-charged gases simultaneously, the combination of steps that consists in: cooling the gas of one type and draining off the condensate ammonia-liquor; distilling said ammonia-liquor by passing through it dust-freed ammonia-charged gas of the other type, at a temperature substantially above the saturation-point of the gas; passing such second-named gas and the still-vapors through an acid-wash to absorb the ammonia of the gas and also the ammonia distillate; conveying the mother-liquor from such acid-wash to a saturation-bath; and passing the first-named gas, of relatively low temperature, through said saturation-bath, therein effecting the absorption of ammonia from said first-named gas and simultaneously effecting the deposition of ammonium sulfate derived from both such ammonia given up by said first-named gas and from the aforesaid mother-liquor, charged with the ammonia of the second-named gas and also with the ammonia-distillate derived from the distillation of the ammonia-liquor condensed from said first-named gas; substantially as specified.

5. In a process for the recovery of ammonia from two different ammonia-charged gases simultaneously, the combination of steps that consists in: cooling the gas of one type and draining off the condensate ammonia-liquor; distilling said ammonia-liquor by passing through it hot dust-freed ammonia-charged gas of the other type; cooling the commingled second-named gas and still-vapors to effect precipitation of the water from the still-vapors; passing such second-named gas and the still-vapors through an acid-wash to absorb the ammonia of the gas and also the ammonia-distillate; conveying the mother-liquor from such acid-wash to a saturation-bath; and passing the first-named gas, of relatively low temperature, through said saturation-bath, therein effecting the absorption of ammonia from said first-named gas and simultaneously effecting the deposition of ammonium sulfate derived from both such ammonia given up by said first-named gas and from the aforesaid mother-liquor, charged with the ammonia of the second-named gas and also with the ammonia-distillate derived from the distillation of the ammonia-liquor condensed from said first-named gas; substantially as specified.

6. In a process for the recovery of ammonia from two different ammonia-charged gases simultaneously, the combination of steps that consists in: cooling the gas of one type and draining off the condensate ammonia-liquor; distilling said ammonia-liquor by passing through it hot dust-freed ammonia-charged gas of the other type; passing the commingled second-named gas and still-vapors through an electrical precipitator to precipitate the tar residue and the water from the still-vapors; passing such second-named gas and the still-vapors through an acid-wash to absorb the ammonia of the gas and also the ammonia-distillate; conveying the mother-liquor from such acid-wash to a saturation-bath; and passing the first-named gas, of relatively low temperature, through said saturation-bath, therein effecting the absorption of ammonia from said first-named gas and simultaneously effecting the deposition of ammonium sulfate derived from both such ammonia given up by said first-named gas and from the aforesaid mother-liquor, charged with the ammonia of the second-named gas and also with the ammonia-distillate derived from the distillation of the ammonia-liquor condensed from said first-named gas; substantially as specified.

7. In a process for the recovery of tar and ammonia from producer-gas, the combination of steps that consists in: electrically precipitating the dust from the hot gas from the producer and concurrently cooling such gas by passing it in counter-current with the air going to the producer; then passing such gas, at a temperature substantially above its saturation-point, through an ammonia-liquor condensate to effect distillation of the ammonia from such ammonia-liquor; then passing the commingled gas and still-vapors through an electrical precipitator, in counter-current with the ammonia-liquor going to the aforesaid distillation-operation, to precipitate the tar residue from the gas and the water from the still-vapors; then passing the commingled gas and still-vapors through an acid-wash to absorb both the ammonia of the gas and the ammonia of distillation; substantially as specified.

8. In a process for the recovery of tar and ammonia from producer-gas, the combination of steps that consists in: passing dust-freed gas, at a temperature substantially above its saturation-point, through an ammonia-liquor condensate to effect distillation of the ammonia from such ammonia-liquor; then passing the commingled gas and still-vapors through an electrical precipitator, in counter-current with the ammonia-liquor going to the aforesaid distillation-operation, to precipitate the tar residue from the gas and the water from the still-vapors; then passing the commingled gas and still-vapors through an acid-wash to absorb both the ammonia of the gas and the ammonia of distillation; substantially as specified.

9. In a process for the recovery of tar and ammonia from ammonia-charged gas, the combination of steps that consists in: passing dust-freed gas, at a temperature substantially above its saturation-point, through an ammonia-liquor condensate to effect distillation of the ammonia from such ammonia-liquor; then passing the commingled gas and still-vapors through an electrical precipitator, in counter-current with the ammonia-liquor going to the aforesaid distillation-operation, to precipitate the tar residue from the gas and the water from the still-vapors; then passing the commingled gas and still-vapors through an acid-wash to absorb both the ammonia of the gas and the ammonia of distillation; substantially as specified.

10. In a process for the recovery of ammonia from ammonia-charged gas, the combination of steps that consists in: passing dust-freed gas, at a temperature substantially above its saturation-point, through an ammonia-liquor condensate to effect distillation of the ammonia from such ammonia-liquor; then passing the commingled gas and still-vapors through a precipitator to effect precipitation of the water from the still-vapors; then passing the commingled gas and still-vapors through an acid-wash to absorb both the ammonia of the gas and the ammonia of distillation; substantially as specified.

11. In a process for the recovery of ammonia from producer-gas and coke-oven gas simultaneously, the combination of steps that consists in: cooling the coke-oven gas and draining off the condensate ammonia-liquor; distilling such ammonia-liquor by passing through it hot dust-freed producer-gas; passing the producer-gas and the still-vapors through an acid-wash to absorb the ammonia of the gas and also the ammonia-vapors of distillation; conveying the mother-liquor from such acid-wash to a saturation-bath; and passing the coke-oven gas, of relatively low temperature, through said saturation-bath, therein effecting the absorption of ammonia from the coke-oven gas and simultaneously effecting the deposition of ammonium sulfate derived from both such ammonia given up by said coke-oven gas and from the aforesaid mother-liquor, charged with the ammonia of the producer-gas and also with the ammonia-vapor derived from the distillation of the ammonia-liquor condensed from the coke-oven gas; substantially as specified.

12. In a process for the recovery of tar and ammonia from producer-gas, the combination of steps that consists in: electrically precipitating the dust from the hot gas from the producer and concurrently cooling such gas by passing it in counter-current with the air going to the producer; then passing such gas, at a temperature substantially above its saturation-point, through an ammonia-liquor condensate to effect distillation of the ammonia from such ammonia-liquor; then passing the commingled gas and still-vapors through an electrical precipitator to precipitate the tar residue from the gas and the water from the still-vapors; then passing the commingled gas and still-vapors through an acid-wash to absorb both the ammonia of the gas and the ammonia of distillation; substantially as specified.

13. In a process for the recovery of tar and ammonia from producer-gas, the combination of steps that consists in: passing dust-freed gas, at a temperature substantially above its saturation-point, through an ammonia-liquor condensate to effect distillation of the ammonia from such ammonia-liquor; then passing the commingled gas and still-vapors through an electrical precipitator to precipitate the tar residue from the gas and the water from the still-vapors; then passing the commingled gas and still-vapors through an acid-wash to absorb both the ammonia of the gas and the ammonia of distillation; substantially as specified.

14. In a process for the recovery of ammonia from ammonia-charged gas, the combination of steps that consists in: passing dust-freed ammonia-charged gas, at a temperature substantially above its saturation-point, through an ammonia-liquor condensate to effect distillation of the ammonia from such ammonia-liquor; and passing the commingled gas and still-vapors through an acid-wash to absorb both the ammonia of the gas and the ammonia of distillation; substantially as specified.

In testimony whereof I have hereunto set my hand this 15th day of August, 1919.

JOSEPH van ACKEREN.